United States Patent Office 3,104,474
Patented Sept. 24, 1963

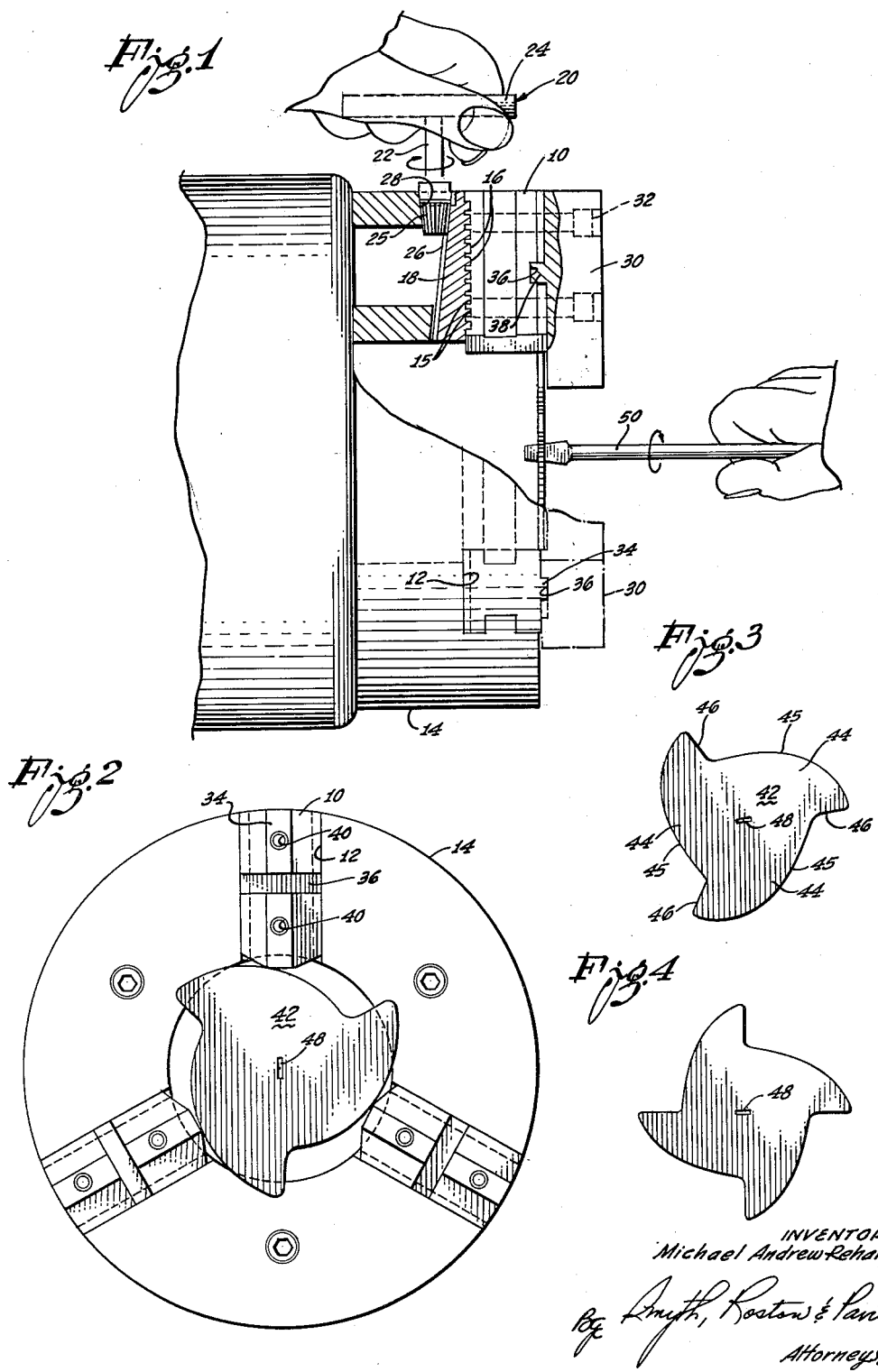

3,104,474
LATHE JAW SETTING DEVICE
Michael Andrew Rehart, Inglewood, Calif., assignor to Ram Products Company, Inglewood, Calif., a partnership
Filed July 11, 1960, Ser. No. 42,072
5 Claims. (Cl. 33—181)

This invention relates to a device for adjusting a plurality of radially movable jaws of a chuck of a machining tool such as a lathe and, more particularly, is directed to the problem of fixedly positioning a set of soft jaws on the chuck for machining of the soft jaws to fit a given workpiece.

While the usual permanent jaws of a lathe may be used to grip most workpieces, and especially workpieces in the form of solid bodies of hard metal, the necessity often arises for a set of jaws with inner gripping faces that are accurately curved to fit a workpiece of a specific diameter. An aluminum cylinder, for example, would be damaged or at least marred by the gripping edges of conventional chuck jaws, whereas jaws with ample gripping surfaces of the exact curvature of the cylinder may be used to hold the cylinder effectively without any marring effect. In such an instance, soft jaws in the form of blocks of mild steel are mounted by screws on the respective permanent jaws of the lathe and then the soft jaws are machined by a cutting tool to form the accurately curved radially inward gripping faces.

To carry out the machining operation, the soft jaws must be rigidly immobilized with the inner ends of the soft jaws accessible by the cutting tool. Rigid immobilization can be accomplished only by tightening either the permanent jaws or the soft jaws into gripping engagement with some object that is thin enough to avoid interfering with the machining operation on the soft jaws.

The usual procedure in preparing for machining the soft jaws to fit a given workpiece is for the lathe operator to hunt for a temporary guide or spacer in the form of a washer or other relatively thin metal disk to be gripped by the permanent chuck jaws just back of the soft jaws that are bolted onto the permanent jaws. With the chuck jaws tightened against the temporary spacer piece, the soft jaws are machined by a cutting tool and then the temporary spacer piece is removed to permit the soft jaws to be used for directly gripping the given workpiece.

A serious disadvantage of this common procedure is that the searching for such a temporary spacer piece of suitable dimensions is time-consuming and necessarily adds to the labor cost. Too often, moreover, such a suitable spacer piece is not immediately available and the job has to be postponed.

Another costly disadvantage is that a temporary spacer piece of optimum diameter for the particular task is not often available. The diameter of the spacer piece must, of course, be small enough to position the soft jaws radially inwardly far enough for the cutting tool to remove sufficient metal to form the curved gripping faces, but too often the only available temporary spacer piece is much smaller than desirable and it becomes necessary to remove much more metal from the soft jaws than is necessary. Such waste of metal reduces the number of times a set of soft jaws can be machined to fit specific workpieces and thus increases the soft jaw cost that must be absorbed on each work order.

The present invention avoids all of these disadvantages. It makes it unnecessary to hunt for temporary spacer pieces. In addition, the invention makes it possible for the lathe operator to adjust any set of soft jaws to the optimum diameter for machining the inner gripping faces with minimum removal of metal.

The invention achieves these advantages by providing a thin plate-like spacer or guide member having a plurality of identical equally circumferentially spaced peripheral lobes corresponding to the plurality of chuck jaws. Thus a three-lobed spacer member is provided for a three-jaw chuck, a four-lobed spacer member for a four-jaw chuck, etc. All of the lobes increase in radial dimension progressively at the same rate in the same circumferential direction. Consequently, if the spacer member is positioned eccentrically of the chuck in the plane of the plurality of jaws, the spacer member will equally limit the freedom for all of the jaws to move inwardly. In other words, at any rotary position of the spacer member, the radii of the spacer member will all be equal at the plurality of points at which the jaws, when adjusted inward, will contact and grip the spacer member. These equal radii that are effective with respect to the chuck jaws may all be varied synchronously by simply rotating the spacer member relative to the chuck and, moreover, may be varied by as small increments as may be desired.

A further feature of the invention is the concept of adapting the thin spacer member for convenient manual rotation by a suitable tool. For this purpose, the preferred embodiment of the invention has a central slot to receive the end of a screw driver.

The various features and advantages of the invention may be understood from the following detailed description together with the accompanying drawing.

In the drawing, which is to be regarded as merely illustrative:

FIG. 1 is a side elevational view of a chuck with parts broken away showing how the spacer member of the invention may be manipulated by means of a screw driver for the purpose of setting the jaws of a lathe chuck in preparation for machining soft jaws;

FIG. 2 is a front elevational view of the chuck showing how the permanent jaws grip the spacer piece, the soft jaws being omitted for clarity of illustration;

FIG. 3 is a face view of the spacer plate shown in FIG. 2, the spacer plate having three lobes for cooperation with three chuck jaws; and FIG. 4 is a face view of a similar spacer plate having four lobes for cooperation with four chuck jaws.

FIGS. 1 and 2 show a conventional chuck of a lathe having three permanent jaws 10 at equal circumferential spacing. The illustrated chuck is of a well-known construction in which the permanent jaws 10 are mounted in radial guideways 12 in the body 14 of the chuck and are formed with inner arcuate teeth 15 for engagement with the helical ribs 16 of a rotary scroll 18.

FIG. 1 shows how a chuck wrench 20 may be used in the usual manner to adjust the radial position of the three jaws 10 in a synchronous manner. The wrench is T-shaped, being formed with a shank 22 and a handle 24. The end of the shank 22 forms a beveled gear 25 to engage gear teeth 26 on the rear face of the scroll 18. The chuck body 14 is provided with a tapered bore 28 to receive and journal the wrench. Rotation of the scroll 18 by the wrench causes synchronous radial movement of the three permanent jaws 10.

FIG. 1 shows how a set of three soft jaws 30 may be mounted on the respective permanent jaws 10 by suitable screws 32. Each permanent jaw 10 has a longitudinal rib 34 to seat in a corresponding longitudinal groove 35 of a soft jaw 30, the rib being interrupted by a transverse groove 36 that seats a transverse rib 38 of the soft jaw. Each of the permanent jaws has two screw holes 40 to receive the screws 32.

The spacer member or guide member of the invention is indicated by reference numeral 42 in FIGS. 1, 2 and 3. As may be seen in FIG. 3, the spacer member, which may be a steel plate, is formed with three peripheral lobes 44 which divide the plate into three equal segments. The peripheral edge 45 of each lobe is curved gradually so that the three lobes progressively increase in radial dimension at the same rate in the same circumferential direction. At each juncture of the three segments, the periphery of the plate forms a steep shoulder 46 which extends inward from the maximum radial dimension of one lobe to the minimum radial dimension of the adjacent lobe.

Such a spacer plate may be adapted in various ways for manual rotary adjustment. Preferably the plate is adapted for manual adjustment by a suitable tool. In this embodiment of the invention, the spacer plate 42 is formed with a slot 48 at its center, the slot being dimensioned to receive the end of a screw driver in the manner shown in FIG. 1.

As may be seen in FIG. 1, the permanent jaws 10 protrude forward from the face of the chuck body 14 so that the soft jaws 30 which are mounted on the permanent jaws overhang the chuck face at slight spacing forward from the chuck face. Typically the mounted soft jaws are spaced forward approximately three-sixteenths of an inch from the chuck face. Preferably the spacer plate 42 of the invention is thin enough to lie back of the soft jaws 30 in the paths of radial advance of the permanent jaws 10 to cooperate with the permanent jaws without touching the soft jaws. For this purpose, the spacer plate 42 may, for example, be one-tenth of an inch thick. It is to be understood, however, that the spacer member 42 may cooperate directly with the soft jaws 30 and, if desired, the soft jaws may be undercut adjacent their rear sides for cooperation with the spacer plate 42. It is somewhat disadvantageous to use the spacer plate 42 in direct contact with the soft jaws 30 because it reduces the portions of the soft jaws that may be cut away to form the desired inner faces for gripping the workpiece.

In a typical procedure for adjusting the chuck in preparation for machining the soft jaws 30 to fit a particular cylindrical workpiece, the permanent jaws 10 are spread apart by the use of the chuck wrench 20 and then the spacer plate 42 is positioned as shown in FIG. 1. The screw driver 50 shown in FIG. 1 is inserted into the center slot 48 so that the screw driver serves not only as a handle for holding the spacer plate against the face of the chuck but also serves as a handle for rotating the spacer plate. With the spacer plate 42 held in position by the screw driver 50, the operator may manipulate the chuck wrench 20 in the manner indicated in FIG. 1 to tighten the permanent jaws 10 against the spacer plate 42 for the purpose of immobilizing the three soft jaws 30 at selected radial positions. The tightening of the permanent jaws 10 against the periphery of the spacer plate 42 takes up the slack or backlash of the jaw adjustment mechanism. With the permanent jaws 10 made rigid in this manner, the soft jaws 30 may be machined to form the desired accurately curved inner faces to fit the selected cylindrical workpiece.

To carry out the purpose of the invention, it is essential that the eccentricity or slope of the peripheral edges 45 of the three lobes 44 of the spacer plate be sufficiently gradual to avoid any tendency whatsoever for the spacer plate to rotate in reaction to the radially inward pressure of the three permanent jaws 10. It has been found that a spacer plate 42 with an average diameter on the order of three to five inches may have a lobe slope wherein the radial dimension increases one-eighth of an inch for each one-half inch of circumference.

If desired, a trial and error procedure may be followed in using the spacer plate. For example, the first cut on the inner ends of the soft jaws may be found to be too large in diameter when the workpiece is inserted by hand for a trial fit. The chuck wrench is then employed to loosen the jaws to permit the spacer plate 42 to be rotated to a smaller effective diameter. With the permanent jaws tightened to the smaller diameter, the cutting tool is adjusted to cut the soft jaws to a smaller diameter for closer fit to the selected workpiece.

It is apparent that a single spacer plate 42 is adjustable through a substantial range of radial dimensions and that a set of spacer plates of different sizes will make it possible to adjust the jaws of a lathe to any workpiece diameter over the wide range of possible adjustment of the chuck jaws. Thus the invention makes it possible in each instance to adjust the chuck jaws to the optimum diameter for machining the soft jaws with minimum removal of the soft jaw material. It is to be further noted that a spacer plate 42 has such a distinctive appearance that it may be readily recognized and it would not be likely that a spacer plate would be inadvertently discarded as a piece of scrap.

My description in specific detail of the selected practice of the invention will suggest various changes, substitutions and other departures from my disclosure within the spirit and scope of the appended claims.

I claim:

1. A device for use on the chuck of a lathe in cooperation with the permanent jaws of the chuck to facilitate adjustment of the chuck for machining soft jaws to conform to selected diameters and to cooperate with the permanent jaws during the machining of the soft jaws, wherein the permanent jaws are radially adjustable and protrude forward from the face of the chuck body by a given dimension and the soft jaws are mounted on the permanent jaws, respectively, in positions overhanging the face of the chuck body with the soft jaws forming with the face of the chuck body corresponding clearance spaces of the given dimension, said device comprising a plate member of a thickness less than the given dimension having a corresponding plurality of equally circumferentially spaced peripheral cams of identical configuration, all of the cams progressively increasing in radial dimension at the same rate in the same circumferential direction whereby the member may be positioned concentrically of the chuck with its respective peripheral cams positioned in said clearance spaces, respectively, in edgewise abutment with the permanent jaws, respectively, whereby the member so positioned may be rotated to vary simultaneously the degree to which the cams limit the freedom for radially inward adjustment of the permanent jaws, and whereby with the member at a selected rotary position the chuck may be manipulated for simultaneous radially inward movement of the permanent jaws into abutment with the cams for tightly gripping the member, the slopes of said cams being gradual to prevent rotation of the member in reaction to the gripping pressure of the jaws.

2. A device as set forth in claim 1 in which said member has surfaces spaced inward from its periphery to receive manually applied force for rotating the member to selected positions.

3. A device as set forth in claim 1 having a central non-circular aperture to receive a tool for manual rotation of the device.

4. A device for use on the chuck of a lathe in cooperation with the permanent jaws of the chuck to facilitate the adjustment of the chuck for machining soft jaws to conform to selected diameters and to cooperate with the permanent jaws during the machining of the soft jaws, wherein the permanent jaws are radially adjustable and protrude forward from the face of the chuck body by a given dimension and the soft jaws are mounted on the permanent jaws, respectively, in positions overhanging the face of the chuck body with the soft jaws forming with the face of the chuck body corresponding clearance spaces of the given dimension, said device comprising a plate member of a thickness less than the given dimension having a central slot to receive the end of a screw driver and having a plurality of equally circumferentially spaced peripheral cams of identical configuration corresponding to the plurality of jaws, all of the cams progressively increasing in radial dimension at the same rate in the same circumferential direction whereby the member may be positioned concentrically of the chuck with its respective peripheral cams positioned in said clearance spaces, respectively, in edgewise abutment with the permanent jaws, respectively, whereby the member so positioned may be rotated to vary simultaneously the degree to which the cams limit the freedom for radially inward adjustment of the permanent jaws, and whereby with the member at a selected rotary position the chuck may be manipulated for simultaneous radial inward movement of the permanent jaws into abutment with the cams for tightly gripping the member, the slopes of said cams being gradual to prevent rotation of the member in reaction to the gripping force of the permanent jaws.

5. A device for use on the chuck of a lathe in cooperation with the permanent jaws of the chuck to facilitate the adjustment of the chuck for machining soft jaws to conform to selected diameters and to cooperate with the permanent jaws during the machining of the soft jaws, wherein the permanent jaws are radially adjustable and protrude forward from the face of the chuck body by a given dimension and the soft jaws are mounted on the permanent jaws, respectively, in positions overhanging the face of the chuck body with the soft jaws forming with the face of the chuck body corresponding clearance spaces of the given dimension, said device comprising a plate member of a thickness less than the given dimension having a central portion shaped for engagement by a tool for manual rotational adjustment of the member and having a corresponding plurality of equally circumferentially spaced peripheral cams of identical configuration, all of the cams progressively increasing in radial dimension at the same rate in the same circumferential direction whereby the member may be positioned concentrically of the chuck with its respective peripheral cams positioned in said clearance spaces, respectively, in edgewise abutment with the permanent jaws, respectively, whereby the member so positioned may be rotated to vary simultaneously the degree to which the cams limit the freedom for radially inward adjustment of the permanent jaws, and whereby with the member at a selected rotary position the chuck may be manipulated for simultaneous radial inward movement of the permanent jaws into abutment with the cams for tightly gripping the member, the slopes of said cams being gradual to prevent rotation of the member in reaction to the gripping pressure of the permanent jaws.

References Cited in the file of this patent

UNITED STATES PATENTS

| 2,572,013 | Cushman | Oct. 23, 1951 |
| 3,046,671 | Moores | July 31, 1962 |

FOREIGN PATENTS

| 296,114 | Germany | Jan. 13, 1917 |